US008305368B2

(12) United States Patent
Chen

(10) Patent No.: US 8,305,368 B2
(45) Date of Patent: Nov. 6, 2012

(54) METHOD FOR DETERMINING AN OPTIMUM SKEW AND ADJUSTING A CLOCK PHASE OF A PIXEL CLOCK SIGNAL AND DATA DRIVER UTILIZING THE SAME

(75) Inventor: Pen-Hsin Chen, Tainan County (TW)

(73) Assignee: Himax Technologies Limited, Sinshih Township, Tainan County (TW)

( * ) Notice: Subject to any disclaimer, the term of this patent is extended or adjusted under 35 U.S.C. 154(b) by 635 days.

(21) Appl. No.: 12/543,622

(22) Filed: Aug. 19, 2009

(65) Prior Publication Data

US 2011/0043493 A1 Feb. 24, 2011

(51) Int. Cl.

| | |
|---|---|
| ***G09G 3/36*** | (2006.01) |
| ***G09G 5/00*** | (2006.01) |
| ***G06F 3/038*** | (2006.01) |
| ***G06F 1/04*** | (2006.01) |
| ***G06F 1/24*** | (2006.01) |
| ***G06F 11/00*** | (2006.01) |

(52) U.S. Cl. ............. 345/204; 345/98; 345/99; 713/503

(58) Field of Classification Search .................. 713/503; 345/73–104, 204–215, 690–699

See application file for complete search history.

(56) References Cited

U.S. PATENT DOCUMENTS

| | | | | |
|---|---|---|---|---|
| 5,847,701 | A * | 12/1998 | Eglit | 345/204 |
| 7,154,493 | B2 * | 12/2006 | Yee | 345/211 |
| 7,852,328 | B2 * | 12/2010 | Park | 345/204 |
| 2005/0007359 | A1 * | 1/2005 | Iseki et al. | 345/204 |
| 2008/0027668 | A1 * | 1/2008 | Chang | 702/106 |

* cited by examiner

*Primary Examiner* — Alexander Eisen
*Assistant Examiner* — Patrick F Marinelli
(74) *Attorney, Agent, or Firm* — Thomas|Kayden

(57) ABSTRACT

A data driver including a receiver, a skew adjusting circuit and a processing device is provided. The receiver samples image data on a data bus according to a processed pixel clock signal. The image data includes pixel data during active periods and a test pattern repeatedly inserted in the image data during blanking periods. The skew adjusting circuit receives a pixel clock signal and adjusts a clock phase of the pixel clock signal by delaying the pixel clock signal with a controllable skew according to a feedback control signal so as to generate the processed pixel clock signal. The processing device stores a predetermined test pattern synchronized with the inserted test pattern, determines an optimum skew by comparing the sampled test patterns with the predetermined test pattern, and generates the feedback control signal including information indicating the optimum skew.

17 Claims, 4 Drawing Sheets

METHOD FOR DETERMINING AN OPTIMUM SKEW AND ADJUSTING A CLOCK PHASE OF A PIXEL CLOCK SIGNAL AND DATA DRIVER UTILIZING THE SAME

BACKGROUND OF THE INVENTION

1. Field of the Invention

The invention relates to a data driver of a display device, and more particularly to a data driver capable of automatically determining an optimum skew and adjusting the clock phase accordingly.

2. Description of the Related Art

Liquid Crystal Displays (LCDs) have become a widely used display device due to its fast response time, light weight, slim profile, high luminance, low power consumption and highly enlargeable display area . . . etc. As the resolution of LCD panels increase, both the number of data drivers (also referred to as source drivers) and transmission speed between the timing controller and the data driver are required to be increased. In order to correctly access data within a valid period, a skew for a system clock (for example, the pixel clock) may be needed. Usually, this period is called the "data valid window", and its delay with respect to the system clock is called the "skew".

Conventionally, the skew is manually adjusted to a fixed value when manufacturing the LCD and will not be changed after leaving the factory. However, since the transmission distances between the timing controller and each data driver are different, the fixed skew may not be suitable for all data drivers, thus limiting operation margin of the LCD. Also, the process, voltage and temperature (PVT) variation of data drivers may also cause the fixed skew value to become inappropriate. Thus, a data driver capable of automatically determining an optimum skew and adjusting the clock phase is highly desired.

BRIEF SUMMARY OF THE INVENTION

Methods for determining an optimum skew of a data driver in a display and data drivers are provided. An embodiment of a data driver for driving image data to be displayed on a panel of a display device comprises a receiver, a skew adjusting circuit and a processing device. The receiver samples the image data on a data bus according to a processed pixel clock signal. The image data comprises pixel data during a plurality of active periods and a test pattern repeatedly inserted in the image data during a plurality of blanking periods. The skew adjusting circuit receives a pixel clock signal and adjusts a clock phase of the pixel clock signal by delaying the pixel clock signal with a controllable skew according to a feedback control signal so as to generate the processed pixel clock signal. The processing device stores a predetermined test pattern synchronized with the inserted test pattern, determines an optimum skew by comparing the sampled test patterns with the predetermined test pattern, and generates the feedback control signal comprising information indicating the optimum skew.

Another embodiment of a method for determining an optimum skew of a data driver in a display comprises: transmitting a test pattern on a data bus during a blanking period, wherein the data bus is also responsible for carrying pixel data of a plurality of frames of image data during active periods; receiving a pixel clock signal; sampling the test pattern according to the pixel clock signal to obtain a sampled test pattern; determining the optimum skew by comparing the sampled test pattern with a pre-stored test pattern.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
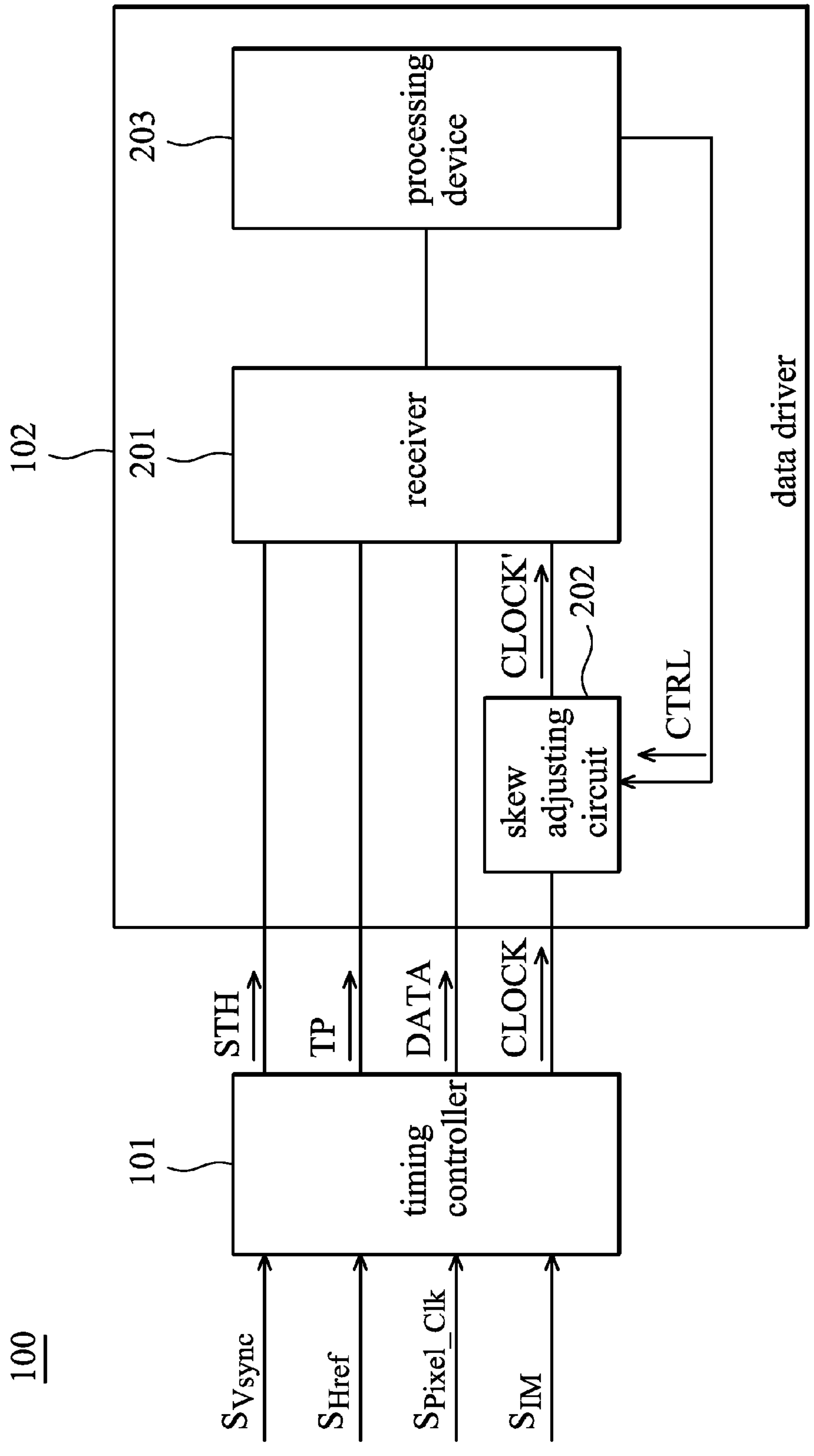
FIG. 1 is a schematic block diagram illustrating a portion of a display device according an embodiment of the invention.
Figure 3:
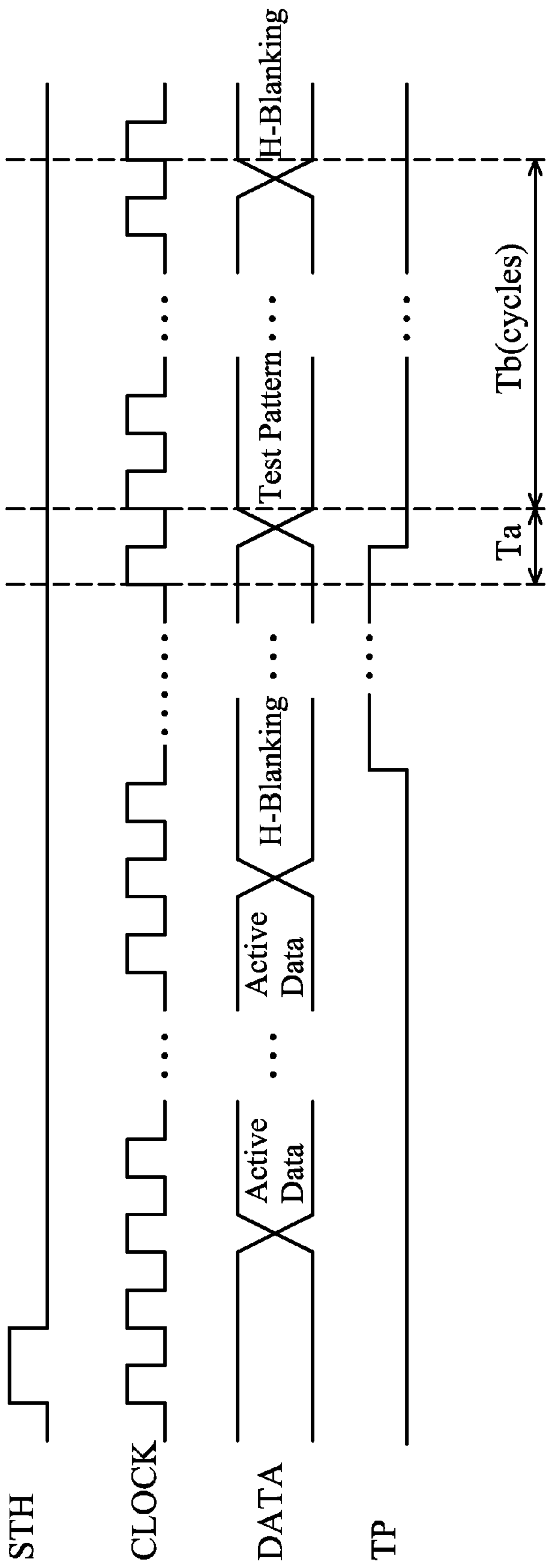
FIG. 3 is a diagram showing the waveforms of the timing control signals and the DATA signals according to an embodiment of the invention.

FIG. 1 is a schematic block diagram illustrating a portion of a display device according an embodiment of the invention. According to the embodiment of the invention, the display device 100 comprises a timing controller 101 and a data driver 102 (also called a source driver). The display device may be, as an example, a liquid crystal display (LCD). The timing controller 101 receives an image data signal $S_{IM}$ from an external image data provider (not shown), and is responsible for transmitting image data to be displayed on a panel (not shown) of the display device 100. The timing controller 101 further generates timing control signals for controlling the transmission of the image data. The timing control signals may be generated according to one or more timing signals received from the image data provider. For example, the image data provider may provide a vertical synchronization signal $S_{Vsync}$ indicating the beginning of a frame transmission (or the frame changes), a horizontal synchronization signal $S_{Href}$ indicating that the image data signal $S_{IM}$ being carried on a data bus is an active pixel data of a frame line, and a pixel synchronization signal $S_{Pixel\_Clk}$ for synchronizing the pixel data transmissions, and so on. The timing controller 101 transmits pixel data of the image data in the DATA signal on a data bus to the data driver 102, and generates the timing control signals comprising, for example, a first timing control STH indicating a beginning of the active pixel data, or active periods of the pixel data of each frame line carried on the data bus, a second timing control TP indicating an end of the active pixel data, or active periods of the pixel data of each frame line carried on the data bus, and the pixel clock signal CLOCK indicating a frequency of the pixel data transmission on the data bus. Refer to FIG. 3 for a corresponding timing diagram of the timing control signals.

According to an embodiment of the invention, the timing controller 101 inserts a predetermined test pattern into the DATA signal to be carried on the data bus during some predetermined time periods, so as to transmit the test patterns during the predetermined time periods. According to an embodiment of the invention, the predetermined time periods may be blanking periods with no active pixel data supposed to be transmitted. As an example, the blanking periods may be the horizontal blanking (H-blanking) period of each frame line without presence of an active pixel data, or the vertical blanking (V-blanking) period of each frame without presence of an active pixel data.

The data driver 102 comprises a receiver 201, a skew adjusting circuit 202 and a processing device 203. The receiver 201 samples the image data, including the active pixel data and the test pattern inserted by the timing controller 101, on the data bus according to a processed pixel clock signal CLOCK'. The skew adjusting circuit 202 is coupled to the receiver 201 and the timing controller 101 to receive the pixel clock signal CLOCK from the timing controller 101, and adjusts clock phase of the pixel clock signal CLOCK by delaying the pixel clock signal with a controllable skew according to a feedback control signal CTRL so as to generate the processed pixel clock signal CLOCK'. The processing device 203 is coupled to the receiver 201 and the skew adjusting circuit 202 and generates the feedback control signal CTRL. According to the embodiment of the invention, for each predetermined time period, the processing device 203 generates the feedback control signal CTRL so as to direct the skew adjusting circuit 202 to adjust the clock phase of the pixel clock signal by delaying the pixel clock signal with different skews. As an example, for the predetermined time period in each frame line, such as the horizontal blanking period of each frame line, the skew adjusting circuit 202 adjusts the clock phase of the pixel clock signal by delaying the pixel clock signal with different skews. The reason to use different skews to sample the test patterns in the predetermined time periods is to obtain a margin of skews so that the receiver 201 is capable of decoding data correctly.

The processing device 203 stores a predetermined test pattern synchronized with the one inserted by the timing controller 101 and information indicating the corresponding controllable skews for the receiver 201 to sample the test patterns in different time periods on the data bus. The processing device 203 receives the sampled test patterns from the receiver 201, and compares the sampled test patterns with the pre-stored predetermined test pattern. According to the embodiment of the invention, the processing device 203 obtains a margin defined by a minimum skew and a maximum skew with the corresponding test patterns equivalent to the predetermined test pattern, and determines an optimum skew according to the margin. According to an embodiment of the invention, the optimum skew may be determined by the processing device 203 according to a mean of the skews distributed within the obtained margin. According to another embodiment of the invention, the optimum skew may be determined by the processing device 203 according to a median of the minimum and maximum skews defining the margin.

The processing device 203 may further generate the feedback control signal CTRL comprising information indicating the optimum skew so as to flexibly control the receiver 201 to sample the pixel data according to the optimum skew via the skew adjusting circuit 202. In this manner, when there is a great amount of data drivers used in the display device, the skew for each data driver may be individually controlled and the operation margin of the display device may be greatly improved.

FIG. 3 is a diagram showing the waveforms of the timing control signals and the DATA signals according to an embodiment of the invention. According to an embodiment of the invention, the receiver 201 may obtain the test pattern according to the first timing signal STH. As an example, at the beginning of the time periods, wherein the test pattern is inserted, a predetermined number of pixel clocks after a STH pulse is determined to have arrived may be predefined, and the receiver 201 may count for the predetermined number of pixel clocks after receiving a STH pulse, and then sample the test pattern thereafter. A data length of the test pattern may also be predefined and known by the receiver 201 in advance. According to another embodiment of the invention, the receiver 201 may sample the test pattern according to the second timing signal TP. As an example, at the beginning of the time periods, wherein the test pattern is inserted, a predetermined number of pixel clocks or a time delay after a TP pulse is determined to have arrived may be predefined, and the receiver 201 may count for the predetermined number of pixel clocks or wait for the time delay after receiving a TP pulse, and then sample the test pattern thereafter. To be specific, as an example, a parameter Ta as shown in FIG. 3 may be defined at the last TP high cycle for indicating the beginning of the inserted test pattern, and another parameter Tb may also be used to define the length of the inserted test pattern, with a unit of a clock cycle.

According to an embodiment of the invention, the optimum skew may be determined per frame. Thus, the processing device 203 may obtain the minimum skew and the maximum skew according to the skews generated within one frame of the image data and the clock phase may be adjusted by the skew adjusting circuit 202 according to the optimum skew per frame. According to another embodiment of the invention, the optimum skew may be periodically determined within a predetermined time interval. Thus, the processing device 203 may obtain the minimum skew and the maximum skew according to the skews generated within the predetermined time interval and the clock phase may be adjusted by the skew adjusting circuit 202 according to the optimum skew accordingly.

Figure 2:
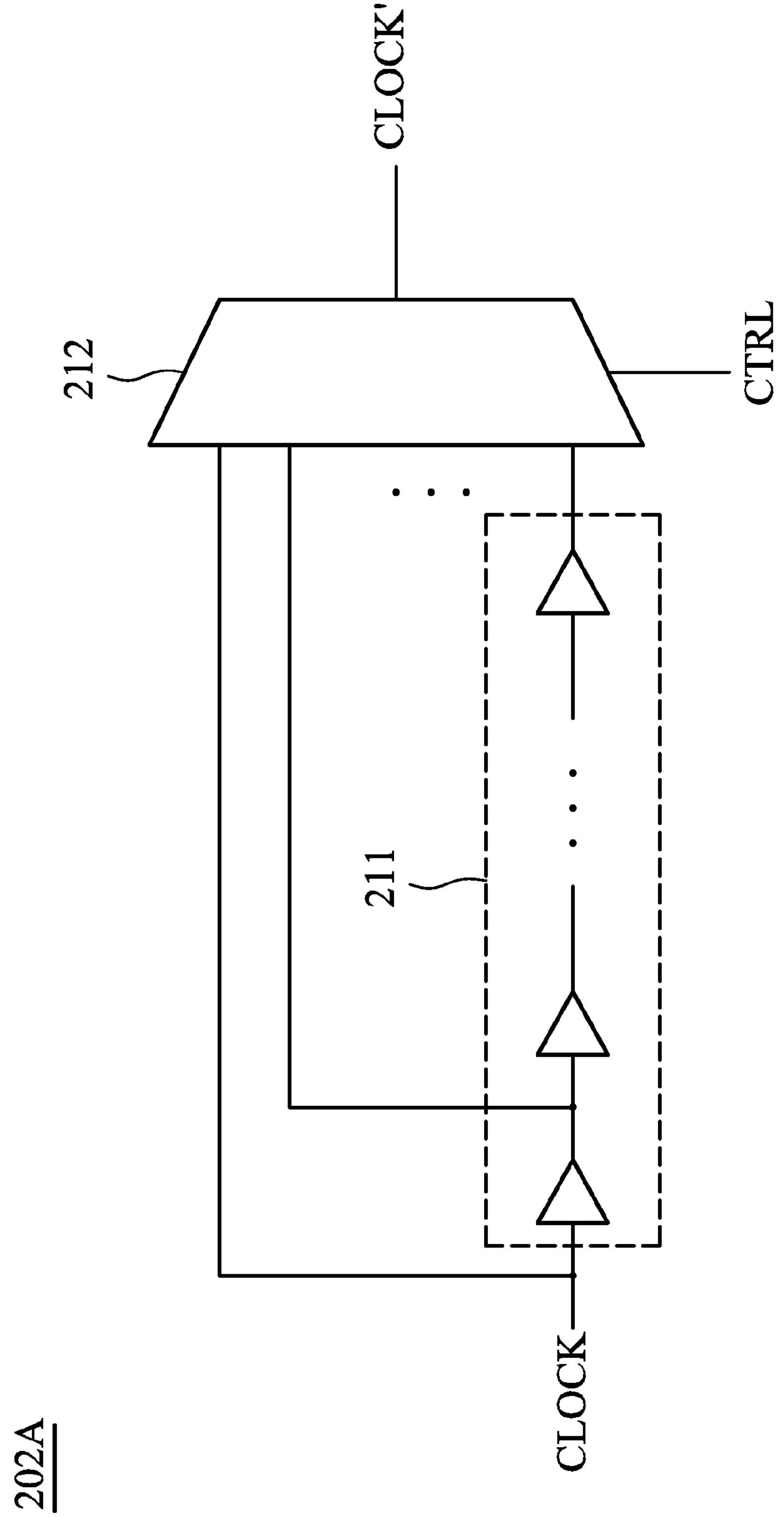
FIG. 2 is a schematic block diagram illustrating the skew adjusting circuit according an embodiment of the invention.

FIG. 2 is a schematic block diagram illustrating the skew adjusting circuit according an embodiment of the invention. The skew adjusting circuit 202 comprises a delay chain 211 and a multiplexer 212. The delay chain 211 receives the pixel clock signal CLOCK and comprises a plurality of delay units for delaying pixel clock signal CLOCK. The multiplexer 212 receives the feedback control signal CTRL and the corresponding delayed pixel clock signal at an output of each delay unit, and selects one of the delayed pixel clock signals according to the feedback control signal to generate the processed pixel clock signal CLOCK'.

Figure 4:
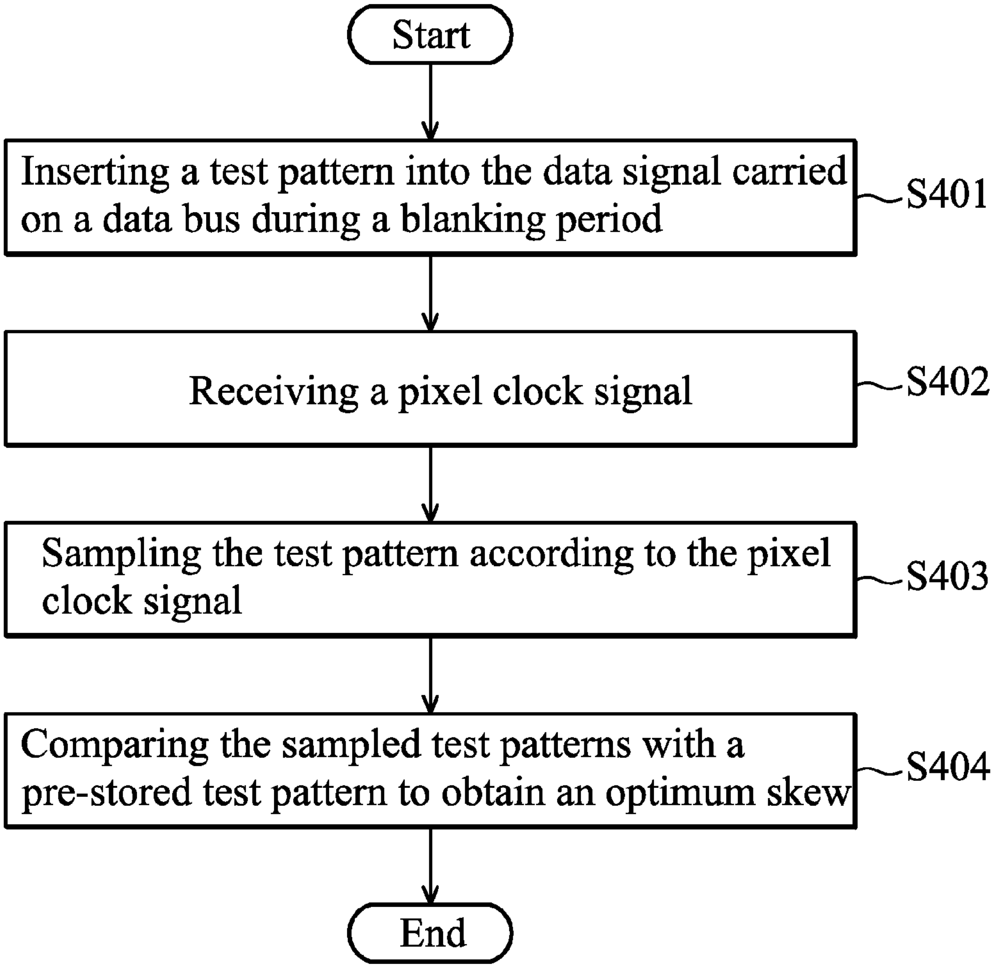
FIG. 4 is a flow chart of a method for determining an optimum skew according to an embodiment of the invention.

FIG. 4 is a flow chart of a method for determining an optimum skew according to an embodiment of the invention. First, a test pattern is inserted into the data signal carried on a data bus during a blanking period (step S401). Next, a pixel clock signal is received (Step S402). Next, the test pattern is sampled according to the pixel clock signal (Step S403). It is noted that the steps S401, S402 and S403 may be repeated in a number of the blanking periods, and in the step S402, a plurality of pixel clock signals with different skews may be respectively received during the blanking periods. Finally, the sampled test patterns are compared with a pre-stored test pattern to obtain an optimum skew (Step S404) In step S404, the sampled test patterns may be compared with the pre-stored test pattern synchronized with the transmitted test pattern, and a margin defined by a minimum skew and a maximum skew with the corresponding sampled test patterns being equivalent to the pre-stored test pattern may be obtained to determine the optimum skew. According to the embodiments of the invention, the optimum skew may be determined according to a mean of the skews distributed within the obtained margin, or determined according to a median of the minimum and maximum skews defining the margin.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data driver for driving image data to be displayed on a panel of a display device, comprising:

a receiver sampling the image data on a data bus from a timing controller in the display device according to a processed pixel clock signal, wherein the image data comprises pixel data during a plurality of active periods and a test pattern repeatedly inserted in the image data by the timing controller during a plurality of blanking periods;

a skew adjusting circuit receiving a pixel clock signal and adjusting a clock phase of the pixel clock signal by delaying the pixel clock signal with a controllable skew according to a feedback control signal so as to generate the processed pixel clock signal; and a processing device storing a predetermined test pattern synchronized with the inserted test pattern, determining an optimum skew by comparing the sampled test patterns with the predetermined test pattern, and generating the feedback control signal comprising information indicating the optimum skew;

wherein the test pattern is repeatedly sampled with different skews to generate the sampled test patterns, the processing device further compares the sampled test patterns with the predetermined test pattern to finds ones, which are equivalent to the predetermined test pattern, in the sampled test patterns, obtains a margin defined by a minimum skew and a maximum skew according to the found sampled test patterns, and determines the optimum skew according to the margin.

2. The data driver as claimed in claim 1, wherein the blanking periods are horizontal blanking periods or vertical blanking periods.

3. The data driver as claimed in claim 1, wherein the receiver further receives a timing signal comprising information indicating a beginning or an end of the active periods, and samples the test patterns according to the timing signal.

4. The data driver as claimed in claim 1, wherein the processing device further generates the feedback control signal to direct the skew adjusting circuit to adjust the clock phase of the pixel clock signal by delaying the pixel clock signal with different skews for each frame line in the blanking periods.

5. The data driver as claimed in claim 1, wherein the minimum skew and the maximum skew are obtained according to the skews generated within one frame of the image data, and the clock phase is adjusted per frame.

6. The data driver as claimed in claim 1, wherein the minimum skew and the maximum skew are obtained according to the skews generated within a predetermined time interval, and the clock phase is adjusted according to the predetermined time interval.

7. The data driver as claimed in claim 1, wherein the optimum skew is determined according to a mean of the skews distributed within the obtained margin.

8. The data driver as claimed in claim 1, wherein the optimum skew is determined according to a median of the minimum and maximum skews defining the margin.

9. The data driver as claimed in claim 1, wherein the skew adjusting circuit comprises:

a delay chain receiving the pixel clock signal and comprising a plurality of delay units for delaying pixel clock signal; and a multiplexer receiving the feedback control signal and the corresponding delayed pixel clock signal at an output of each delay unit, and selecting one of the delayed pixel clock signals according to the feedback control signal to generate the processed pixel clock signal.

10. A method for determining an optimum skew of a data driver in a display, the method comprising:

receiving image data on a data bus from a timing controller in the display device by the data driver, wherein the image data comprises pixel data during a plurality of active periods and a test pattern repeatedly inserted in the image data by the timing controller during a plurality of blanking periods;

receiving a pixel clock signal by the data driver;

sampling the test pattern according to the pixel clock signal to obtain a sampled test pattern by the data driver;

determining the optimum skew by comparing the sampled test pattern with a pre-stored test pattern by the data driver;

wherein the receiving step and the sampling step are repeated in a number of the blanking periods, and the receiving step respectively receives the pixel clock signals with different skews during the blanking periods;

wherein the test pattern is repeatedly sampled with the different skews according to the pixel clock signal during the number of the blanking periods, and the determining step further comprises:

comparing the sampled test patterns with the predetermined test pattern to find ones, which are equivalent to the predetermined test pattern, in the sampled test patterns;

obtaining a margin defined by a minimum skew and a maximum skew according to the found sampled test patterns; and determining the optimum skew according to the margin.

11. The method as claimed in claim 10, wherein the blanking period is a horizontal blanking period.

12. The method as claimed in claim 10, wherein the optimum skew is determined according to a mean of the skews distributed within the obtained margin.

13. The method as claimed in claim 10, wherein the optimum skew is determined according to a median of the minimum and maximum skews defining the margin.

14. The method as claimed in claim 10, further comprising:

receiving a timing signal comprising information indicating a beginning or an end of active pixel data of each frame line carried on the data bus; and sampling the test patterns with different skews for each frame line according to the timing signal.

15. The method as claimed in claim 14, wherein the test pattern, the pixel clock signal and the timing signal are transmitted by a timing controller, and wherein the pre-stored test pattern is stored in advance and is compared to the sampled test patterns by the data driver.

16. The method as claimed in claim 10, further comprising:

adjusting a clock phase of the received pixel clock signal according to the optimum skew; and sampling the pixel data according to the adjusted pixel clock signal.

17. A display device, comprising:

a timing controller, configured to receive an image data and repeatedly insert a test pattern in the image data during a plurality of blanking periods, such that the image data comprises pixel data during a plurality of active periods and a test pattern in the image data during the blanking periods; and a data driver, comprising:

a receiver, configured to sample the test pattern in the image data from the timing controller on a data bus according to a processed pixel clock signal;

a skew adjusting circuit, configured to receive a pixel clock signal and adjust a clock phase of the pixel clock signal by delaying the pixel clock signal with a controllable skew according to a feedback control signal so as to generate the processed pixel clock signal; and a processing device, configured to store a predetermined test pattern synchronized with the inserted test pattern, determine an optimum skew by comparing the sampled test pattern with the predetermined test pattern, and generate the feedback control signal comprising information indicating the optimum skew;

wherein the test pattern is repeatedly sampled with different skews to generate the sampled test patterns, the processing device further compares the sampled test patterns with the predetermined test pattern to finds ones, which are equivalent to the predetermined test pattern, in the sampled test patterns, obtains a margin defined by a minimum skew and a maximum skew according to the found sampled test patterns, and determines the optimum skew according to the margin.

* * * * *